United States Patent [19]

Kuby

[11] 4,261,692

[45] Apr. 14, 1981

[54] ROLL PRESS FOR FORMING BRIQUETTES

[75] Inventor: Otakar A. Kuby, Cleveland, Ohio

[73] Assignee: Davy McKee Corporation, Cleveland, Ohio

[21] Appl. No.: 90,462

[22] Filed: Nov. 1, 1979

[51] Int. Cl.³ .......................... B29C 3/00; B29C 15/00

[52] U.S. Cl. .................................... 425/194; 425/237; 425/363

[58] Field of Search ............... 425/193, 194, 195, 233, 425/237, 363, 367

[56] References Cited

U.S. PATENT DOCUMENTS

| | | | |
|---|---|---|---|
| 1,639,440 | 8/1927 | Smith | |
| 1,775,277 | 9/1930 | Gahn | 425/194 |
| 2,958,902 | 11/1960 | Decker et al. | 425/195 |
| 3,077,634 | 2/1963 | Komarek et al. . | |
| 3,829,267 | 8/1974 | Woodward | 425/237 |
| 3,907,486 | 9/1975 | Kennedy | 425/237 X |
| 3,938,930 | 2/1976 | Lauterback | 425/194 X |
| 3,969,062 | 7/1976 | Komarek | 425/237 X |
| 3,981,477 | 9/1976 | Ambrust et al. . | |
| 3,989,441 | 11/1976 | Lauterbach | 425/194 X |
| 4,019,846 | 4/1977 | Greenberger . | |
| 4,097,215 | 6/1977 | Komarek | 425/237 X |
| 4,123,971 | 11/1978 | Bergendahl | 425/237 X |

*Primary Examiner*—J. Howard Flint, Jr.

*Attorney, Agent, or Firm*—Bernard & Brown

[57] ABSTRACT

A roll press includes two coacting rolls arranged to form briquettes by engagement of coacting surfaces having suitable depressions formed therein. Each of the rolls includes a central arbor of polygonal cross section including a plurality of flat faces each having a dovetail slot therein, a plurality of segments each slidably received in a corresponding dovetail slot, and retaining plates on each side of the arbor for engaging the ends of the segments and to limit axial displacement. The mounting arrangement for the retaining plates provides for thermal expansion of the segments in one axial direction. Each segment is mounted in its dovetail slot with a slight space between the inner face of the segment and the bottom wall of the slot so that precise machining of the inner face of the segment and the bottom of the dovetail slot is not necessary. A cooling arrangement is provided which comprises a plurality of spaced axially extending passages connected by diagonal passages. Plugs are employed for closing the ends of the spaced passages to insure against leakage of fluid therefrom.

10 Claims, 6 Drawing Figures

ROLL PRESS FOR FORMING BRIQUETTES

BACKGROUND OF THE INVENTION

1. Field of the Invention

This invention relates to roll-type compressing apparatus and more particularly to roll presses utilized in forming briquettes by hot or cold pressing coal char, reduced iron ore and other substances.

2. Description of the Prior Art

Roll presses used as briquetting apparatus usually include a central arbor upon which are mounted a plurality of replaceable segments having surfaces formed therein for shaping material to the desired briquette shape. Since such apparatus may be employed with material at relatively high temperatures, it is desirable that provision be made for thermal expansion of the segments during use. Moreover, where such apparatus is used at relatively high temperatures it is necessary to provide suitable cooling for the mounting arbor and the segments mounted thereon. Further, it is desirable that such segments be held firmly in position while still allowing for the necessary thermal expansion. Should any segment become broken or distorted during use it is also desirable that provision be made for relatively easy replacement of such segment.

Prior art briquetting machines have had a number of disadvantages. For example, some machines have included for cooling purposes a plurality of spaced passages extending in a generally axial direction through the arbor and have included at the ends thereof manifold structures secured to the arbor for providing communication between the spaced passages. Unfortunately such constructions provide a source of leakage at the manifolds, particularly as a result of thermal changes and stresses induced in the structure during the forming of briquettes. Further, in some such structures the mounting of the segments is such that the cooling passages are not sufficiently close to the segments to provide optimum cooling thereof.

In other prior art structures the arrangement for mounting the segments significantly limits the thermal expansion thereby causing undesirable build up of stresses in the segments.

In other prior art structures a relatively complex structure including arrangements for mating of cooling passages is employed for mounting the segments so that removal and replacement thereof involves a relatively lengthy and complex procedure.

By the present invention a roll press for forming briquettes is provided wherein the briquette-forming segments are easily and securely mounted on the supporting arbor, adequate provision is made for thermal expansion in a controlled manner, and provision is made for effective cooling while still minimizing the possibility of leakage of the cooling fluid. Provision is also made for securely mounting the segments while still simplifying the machining thereof and while permitting relatively easy replacement thereof when necessary.

SUMMARY OF THE INVENTION

In carrying out this invention, in one form thereof, there are provided two coacting rolls arranged to form briquettes by engagement of coacting surfaces having suitable depressions formed therein. Each of the rolls includes a central arbor of polygonal cross section including a plurality of flat faces each having a dovetail slot therein, a plurality of segments each slidably received in a corresponding dovetail slot, and retaining plates on each side of the arbor for engaging the ends of the segments and to limit axial displacement. The mounting arrangement for the retaining plates provides for thermal expansion of the segments in one axial direction. Each segment is mounted in its dovetail slot with a slight space between the inner face of the segment and the bottom wall of the slot so that precise machining of the inner face of the segment and the bottom of the dovetail slot is not necessary. A cooling arrangement is provided which comprises a plurality of spaced axially extending passages connected by diagonal passages. Plugs are employed for closing the ends of the spaced passages to insure against leakage of fluid therefrom.

DESCRIPTION OF THE PREFERRED EMBODIMENT

Figure 1:
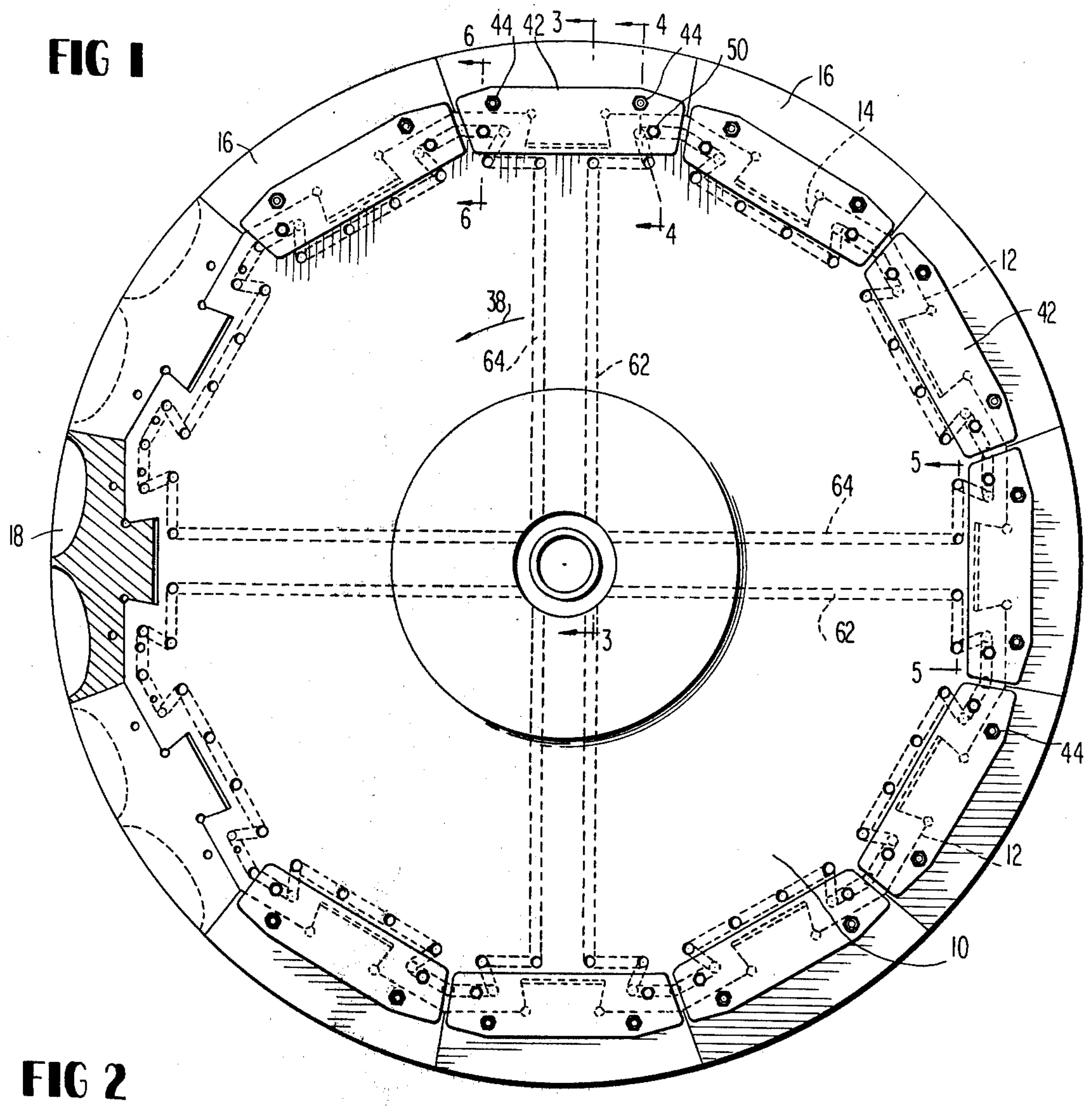
FIG. 1 is an elevation view of one roll of a roll press made in accordance with this invention.
Figure 2:
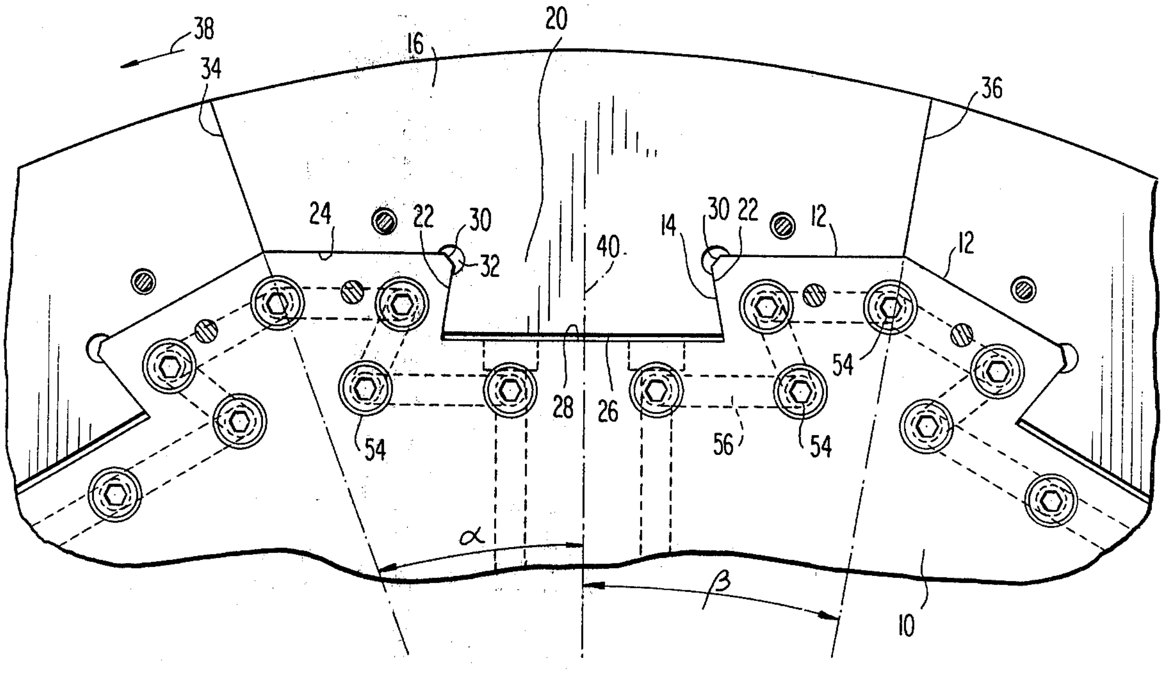
FIG. 2 is an enlarged view of a portion of FIG. 1 showing details of construction.

Referring now to FIGS. 1 and 2 of the drawings, there is shown one roll of a roll press for forming briquettes. Roll presses of this type include two identical rolls which are mounted in a face to face relationship and coact to form briquettes, the rolls containing mating depressions, each of which serves to form half of a briquette. Since the rolls are in all respects identical, only one such roll has been shown in the drawings.

Each roll includes an arbor or core which is of polygonal shape, including a plurality of faces. In the particular embodiment shown the roll is in the form of dodecagon, having twelve such faces. Each face 12 is formed to include a dovetail slot 14, and a plurality of mold segments 16 are received in these dovetailed slots in accordance with one aspect of this invention. Each segment includes a plurality of depressions 18 for receiving the material which is to be formed into briquettes and, in cooperation with an opposite depression in the corresponding segment of the coacting roller, forming the briquette therefrom.

It is desirable that the segments be able to withstand high temperatures and high forces, that they be held firmly in place but still with provision for thermal expansion which occurs during operation of the apparatus and that they be easily replaceable when that becomes necessary. In the roll press of this invention all these desirable features are incorporated.

As shown in FIGS. 1 and 2, each segment 16 is formed to include an inner portion 20 which includes sloping slides 22 arranged to fit within the dovetail slot 14 to engage the sloping walls thereof. Each segment includes faces 24 extending laterally from the inner portion 20 and arranged for engagement with the corresponding face 12 of the arbor 10.

As shown most clearly in FIG. 2, the inner portion 20 of the segment 16 has a radial thickness that is slightly less than the depth of the dovetail slot 14 so that the radially inner face 26 is slightly spaced from the bottom wall 28 of the dovetail slot. Because of this slight spacing the need for very precise machining at the bottom of the dovetail slot and of the radially inner face of the segment is eliminated, but at the same time the segment is held radially firmly in place because of the engagement of the sloping sides with the walls of the dovetail slot and the engagement of the faces 24 with the face 12 of the arbor.

Each segment 16 is assembled within its corresponding dovetail slot by aligning the segment with the slot and then moving it axially of the roll until it is assembled in position within the slot. To minimize the stress concentration the upper corners of the dovetail slot are chamfered, as indicated at 30 and the adjacent portions of the segment are relieved as indicated at 32. The two sloping walls of the dovetail slot have substantially the same angle with the bottom wall 28 of the slot. In the preferred form of this invention, this angle is approximately 70°; it may vary with the physical size of the segments.

On the other hand, the angles of the faces 34 and 36 of the outer portion of the segment are not the same. Specifically, assuming rotation of the roll in the direction indicated by the arrow 38, the leading face 34 of the segment is arranged at an angle with respect to a line 40 normal to the bottom wall 28 of the dovetail slot which is greater than the angle formed between the trailing face 36 and this line 40. Thus, referring to FIG. 2, the angle $\alpha$ is greater than the angle $\beta$, as shown therein. The angle $\alpha$ is larger than the angle $\beta$ by an amount which is governed by the number of segments employed. In the particular form of the invention illustrated in the drawings, the angle $\alpha$ is approximately 15° greater than the angle $\beta$. The reason for this difference in the inclination of the faces 34 and 36 of the outer portion of this segment is that the resultant force as encountered by the segment, varying in direction and in magnitude, always intersects the segment face 24. Constructing the segment with the angular relationship indicated diminishes the tilting effect which otherwise would be encountered.

Figure 3:
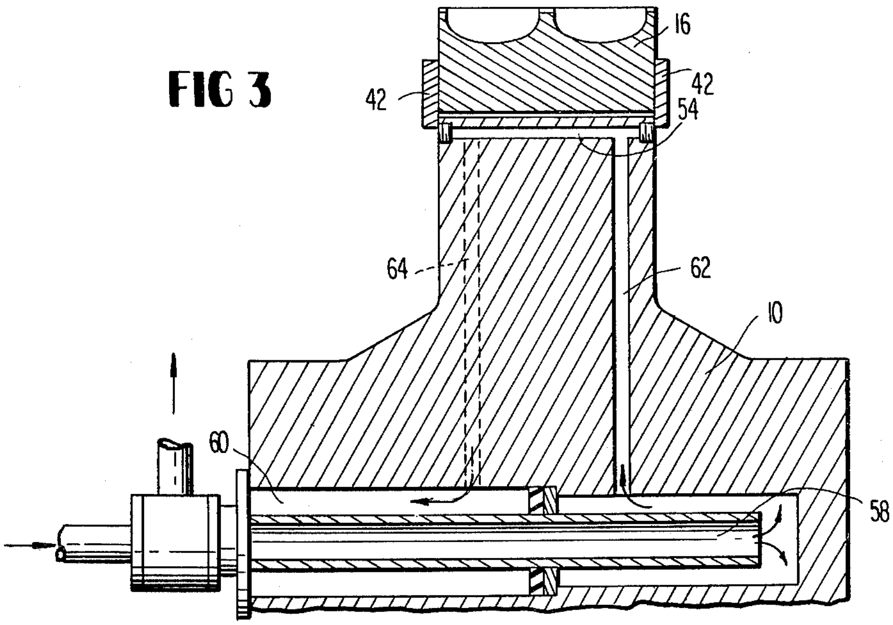
FIG. 3 is a sectional view taken along the line 3—3 in FIG. 1.
Figure 4:
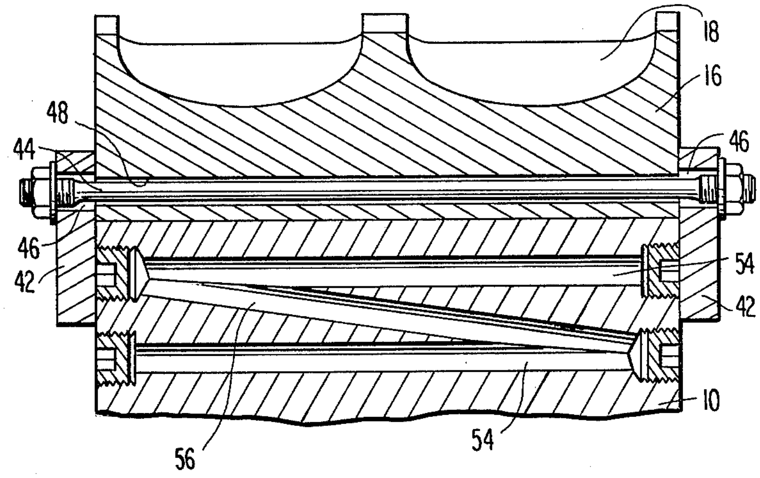
FIG. 4 is a sectional view taken along the line 4—4 in FIG. 1.

In accordance with this invention the segments are retained in the arbor in a manner which accommodates the thermal expansion encountered during operation of the press and limits that expansion to a particular desired direction. Referring now to FIGS. 3 and 4, it can be seen that each of the segments 16 is held in place by a pair of retaining plates 42, one at each axial end of the segment. A portion of each retaining plate 42 engages a wall of the arbor 10 and another portion extends radially outwardly to engage one end of the corresponding segment 16. In order to hold the retaining plates in engagement with the arbor 10 and the segments 16 a plurality of tension bolts 44 are employed. In the particular embodiment shown two such tension bolts 44 are employed for each segment. Each tension bolt extends through an aperture 46 in the retaining plates 42 and through a passage 48 extending axially through the segment 16 in alignment with the aperture 46. The tension bolts, while holding the retaining plates 42 firmly in engagement with the arbor 10 and the corresponding segments 16, provide for expansion of the segments 16 during the higher temperatures encountered during operation of the roll press. When this thermal expansion occurs the tension bolts 44 elongate sufficiently to permit the necessary axial thermal expansion of the segments 16.

Figure 6:
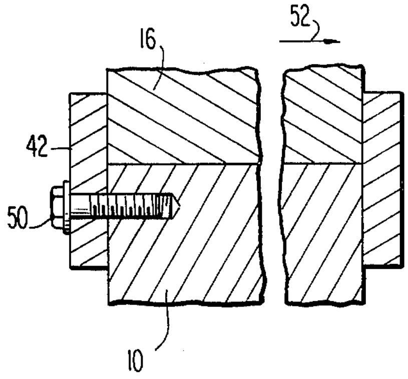
FIG. 6 is a sectional view taken along the line 6—6 in FIG. 1.

In order to limit this thermal expansion of the segment to one particular direction one of the retaining plates 42 is firmly bolted into engagement with the arbor 10. As shown in FIG. 6 a threaded aperture is formed in the arbor 10 and a bolt 50 is arranged to extend through one of the retaining plates 42 and into engagement with the threaded aperture in the arbor 10. Thus the retaining plate 42 at one end of the segment is fixed in position and no expansion of the segment 16 may occur in that direction. Therefore, all axial thermal expansion of the segment will occur in the other direction that is in the direction indicated by the arrow 52 in FIG. 6.

Since, in the forming of briquettes from some materials, the segments 16 may be subjected to substantial heat, it is desirable to have a suitable cooling arrangement. In accordance with this invention, a cooling arrangement is provided in the arbor in a position in relatively close proximity to the segments. This cooling arrangement is shown in its overall form in FIGS. 1 and 2 and in more detail in FIGS. 3, 4 and 5. Referring to these figures, it can be seen that the cooling arrangement includes a plurality of axially extending spaced passages 54 and a plurality of diagonal passages 56. One such diagonal passage is connected, at opposite ends, to each adjacent pair of spaced passages 54 to provide continuous fluid communication through a portion of the arbor. Provision for supply and discharge of cooling fluid to the passages is provided through a combined central inlet and outlet of conventional construction at the axis of the arbor. Incoming fluid is provided through a central passage 58 and is discharged through a concentric passage 60. Fluid from the passage 58 is conducted radially outwardly through a conduit 62 to the aforementioned passages 54 and 56 and is returned to the discharge passage 60 through a conduit 64. In the particular embodiment shown four such inlet and outlet conduits 62 and 64, respectively, are provided for cooling the arbor and the associated segments, each pair of inlet and outlet conduits serving an area comprising one quarter of the arbor and the segments associated therewith.

Figure 5:
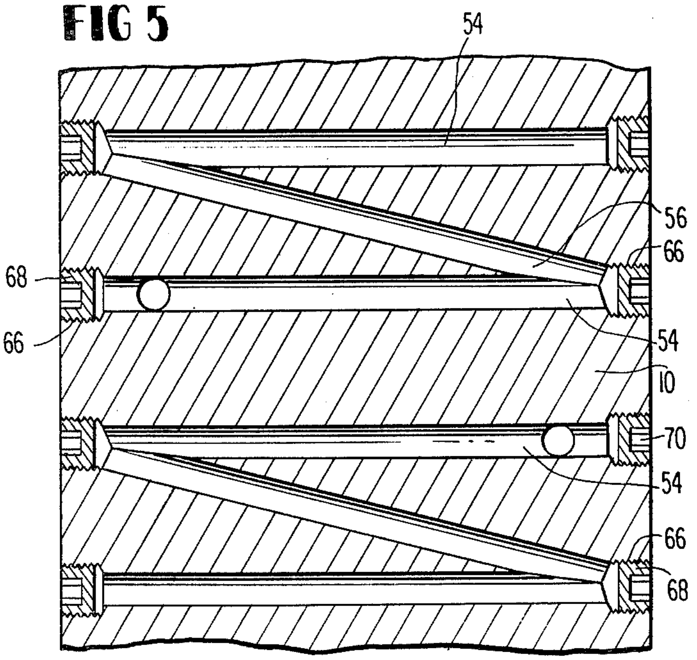
FIG. 5 is a sectional view taken along line 5—5 in FIG. 1.

Referring particularly to FIGS. 1 and 2 it can be seen that the cooling arrangement of this invention permits the passages 54 and 56 to be arranged relatively closely adjacent to the segments 16 so as to secure more effective cooling thereof. The cooling arrangement of this invention is designed so that it is relatively easy to form the cooling passages therein and the problem of leakage is essentially eliminated. Referring to FIGS. 4 and 5, it can be seen that the spaced axial passages 54 are readily bored directly through the arbor from one side thereof to the other. Similarly, the connecting diagonal passages are easily bored from one side of the arbor 10 at the end of one axial passage 54 to the other side of the arbor 10 at the opposite end of the adjacent passage 54 to which the diagonal passage 56 provides connection. The ends of the passages 54 at the faces of the arbor 10 are reamed somewhat larger than the diameter of the passages themselves and are threaded as indicated at 66. A plug 68 is screwed into firm sealing engagement with the threaded opening 66 to seal the passages against external leakage. The plug 68 has a hexagonal central recess for receiving a suitable wrench to screw the plug into its sealing position.

It can be seen from the foregoing discussion that the applicant has provided a roll press construction which includes a convenient arrangement for assembling and disassembling segments thereof, for retaining the segments firmly in position but allowing for expansion in a controlled manner. Moreover, a cooling arrangement has been provided which is particularly effective for cooling the segments and which minimizes any leakage. The cooling arrangement is constructed so that the cooling fluid is brought into relatively close proximity to the segments to increase the effective cooling thereof. By the construction disclosed the segments may be made of a size which is sufficiently small so that through hardening of the segments is accomplished relatively easily.

While a specific embodiment of this invention has been shown and described it is not intended that the invention be limited to the particular construction so shown and described and it is therefore intended by the appended claims to cover all modifications that come within the spirit and scope of this invention.

It is claimed:

1. A roll press for forming briquettes from loose material, said press comprising a pair of coacting rolls, each of said rolls comprising:

(a) a central arbor of polygonal cross section, including a plurality of flat faces;

(b) each of said faces having a slot of dovetail cross section formed therein, said slot extending axially of said arbor;

(c) a briquette-forming segment adjacent each of said faces, each segment being shaped on its radially inner portion to conform generally to said slot whereby said segment is held against radial movement by engagement with walls of said slot;

(d) a plurality of retaining plates for retaining each of said segments against axial movement, one of said plates engaging one face of said arbor adjacent a corresponding slot and the other engaging the opposite face of said arbor adjacent said slot;

(e) means extending through said plates for holding said plates against said arbor and said segments to retain said segments but to permit axial thermal expansion of said segments.

2. The press of claim 1 wherein said means comprises tension bolts.

3. The press of claim 2 wherein each of said tension bolts extends through one of said segments and through corresponding plates at the ends of the segment.

4. The press of claim 1 and further including means engaging said arbor for holding one of said plates in engagement with said arbor to cause axial thermal expansion of said segment to be limited to movement in one direction.

5. The press of claim 4 wherein said means for holding said one of said plates in engagement with said arbor comprises a bolt extending through said one of said plates and engaging said arbor.

6. The press of claim 1 wherein the radial thickness of said inner portion of each of said segments is less than the depth of said dovetail slot whereby said each of said segments is spaced from the bottom of its corresponding slot.

7. The press of claim 1 wherein each face of said arbor is chamfered at the corresponding dovetail slot and the portion of each segment adjacent said chamfer is relieved to provide a space between said chamfer and said segment.

8. The press of claim 1 wherein the angle formed by the leading edge of each segment with a line normal to the radially inner face of the segment is greater than the angle formed by the trailing edge of said segment with said line.

9. The press of claim 1 and further including:

(a) means for cooling said segments;

(b) said cooling means including a plurality of passages spaced about said arbor and extending through said arbor in a direction substantially parallel to the axis of said arbor;

(c) said cooling means further including a plurality of diagonal passages, one such diagonal passage extending between opposite ends of each adjacent pair of spaced passages to provide communication therebetween; and (d) a plug received at each end of each of said spaced passages for sealing said spaced passages and said diagonal passages against leakage of fluid.

10. Cooling means for cooling a plurality of segments mounted on an arbor of a briquette-forming press, said cooling means comprising:

(a) a plurality of passages spaced about said arbor and extending through said arbor in a direction substantially parallel to the axis of said arbor;

(b) a plurality of diagonal passages, one such diagonal passage extending diagonally between opposite ends of each adjacent pair of spaced passages to provide communication therebetween; and (c) a plug received at each end of each of said spaced passages for sealing said spaced passages and said diagonal passages against leakage of fluid.

* * * * *